United States Patent
Ueda

(10) Patent No.: US 10,465,747 B2
(45) Date of Patent: Nov. 5, 2019

(54) BEARING STRUCTURE AND TURBOCHARGER

(71) Applicant: IHI Corporation, Koto-ku (JP)

(72) Inventor: Akihiro Ueda, Tokyo (JP)

(73) Assignee: IHI Corporation, Koto-ku (JP)

(*) Notice: Subject to any disclaimer, the term of this patent is extended or adjusted under 35 U.S.C. 154(b) by 0 days.

(21) Appl. No.: 15/862,032

(22) Filed: Jan. 4, 2018

(65) Prior Publication Data

US 2018/0128318 A1 May 10, 2018

Related U.S. Application Data

(63) Continuation of application No. PCT/JP2016/070401, filed on Jul. 11, 2016.

(30) Foreign Application Priority Data

Jul. 21, 2015 (JP) ................................ 2015-144019

(51) Int. Cl.
*F16C 33/10* (2006.01)
*F16C 17/10* (2006.01)
(Continued)

(52) U.S. Cl.
CPC .......... *F16C 33/106* (2013.01); *F01D 25/186* (2013.01); *F16C 17/10* (2013.01);
(Continued)

(58) Field of Classification Search
CPC .............. F16C 33/6659; F16C 2360/24; F16C 33/106; F16C 17/10; F16C 27/02;
(Continued)

(56) References Cited

U.S. PATENT DOCUMENTS

2007/0059157 A1* 3/2007 Dellmann .......... F01D 25/125
415/112
2008/0098735 A1* 5/2008 Gutknecht ........... F01D 25/166
60/605.3
(Continued)

FOREIGN PATENT DOCUMENTS

CN 103534460 A 1/2014
JP 2007-285252 11/2007
(Continued)

OTHER PUBLICATIONS

International Search Report dated Oct. 4, 2016 in PCT/JP2016/070401 filed Jul. 11, 2016 (with English Translation).
(Continued)

*Primary Examiner* — Alan B Waits
(74) *Attorney, Agent, or Firm* — Oblon, McClelland, Maier & Neustadt, L.L.P.

(57) ABSTRACT

A bearing structure includes: a bearing housing having a bearing hole to which an opening portion of an oil supply passage is opened; and a semi-floating bearing including: an annular main body portion, which is received in the bearing hole, and has a bearing surface formed on an inner peripheral surface thereof; and one or a plurality of oil-introducing holes, which are formed in the main body portion to penetrate from an outer peripheral surface of the main body portion to the inner peripheral surface of the main body portion. At least one of the one or the plurality of oil-introducing holes is partially or entirely opposed to the opening portion of the oil supply passage, and is formed into a special hole in which a length in a rotation direction of a shaft is larger than a length in an axial direction of the shaft.

8 Claims, 6 Drawing Sheets

(51) Int. Cl.
    *F01D 25/18* (2006.01)
    *F16C 35/02* (2006.01)
    *F16C 27/02* (2006.01)
    *F02B 39/00* (2006.01)
(52) U.S. Cl.
    CPC .............. *F16C 27/02* (2013.01); *F16C 35/02* (2013.01); *F02B 39/00* (2013.01); *F05D 2220/40* (2013.01); *F16C 2360/24* (2013.01)
(58) Field of Classification Search
    CPC ........ F16C 35/02; F01D 25/186; F02B 39/00; F05D 2220/40
    See application file for complete search history.

(56) References Cited

U.S. PATENT DOCUMENTS

| | | | |
|---|---|---|---|
| 2009/0238689 A1* | 9/2009 | Jamil | F01D 25/166 415/229 |
| 2014/0219777 A1* | 8/2014 | Uneura | F01D 25/186 415/112 |
| 2017/0045085 A1* | 2/2017 | Sugiura | F16C 17/02 |

FOREIGN PATENT DOCUMENTS

| | | |
|---|---|---|
| JP | 2008-215453 | 9/2008 |
| JP | 2010-156214 | 7/2010 |
| JP | 2014-051939 | 3/2014 |
| JP | 2014-238009 | 12/2014 |

OTHER PUBLICATIONS

Written Opinion dated Oct. 4, 2016 in PCT/JP2016/070401 filed Jul. 11, 2016.
International Preliminary Report on Patentability and Written Opinion dated Feb. 1, 2018 in PCT/JP2016/070401 (submitting English translation only).
Office Action dated Sep. 4, 2018 in corresponding Japanese Patent Application No. 2017-529555 (with English Translation), 8 pages.
Chinese Office Action issued in Chinese Patent Application No. 201680039460.2 dated May 31, 2019 (w/ English translation).

* cited by examiner

BEARING STRUCTURE AND TURBOCHARGER

CROSS REFERENCE TO RELATED APPLICATIONS

This application is a continuation application of International Application No. PCT/JP2016/070401, filed on Jul. 11, 2016, which claims priority to Japanese Patent Application No. 2015-144019, filed on Jul. 21, 2015, the entire contents of which are incorporated by reference herein.

BACKGROUND ART

Technical Field

The present disclosure relates to a bearing structure including a semi-floating bearing, and to a turbocharger including the bearing structure.

Related Art

Hitherto, there has been known a turbocharger in which a shaft is axially supported so as to be rotatable in a bearing housing. A turbine impeller is provided at one end of the shaft, and a compressor impeller is provided at another end of the shaft. The turbocharger is connected to an engine. The turbine impeller is rotated by exhaust gas discharged from the engine. The rotation of the turbine impeller causes the compressor impeller to rotate through the shaft. The turbocharger compresses air along with the rotation of the compressor impeller and delivers the compressed air to the engine.

For example, in Patent Literature 1, there is disclosed a turbocharger including a full-floating bearing being one type of a bearing. The full-floating bearing includes an annular main body portion into which a shaft is inserted. This main body portion is received in a bearing hole formed in a housing so as to be rotatable. On an inner peripheral surface of the main body portion, there is formed a bearing surface for axially supporting the shaft so that the shaft is rotatable. In the housing, there is formed an oil supply passage for supplying lubricating oil to the bearing surface.

CITATION LIST

Patent Literature

Patent Literature 1: Japanese Patent Application Laid-Open No. 2008-215453

SUMMARY

Technical Problem

In recent years, in the field of rotary machines including turbochargers, further increase in speed has been demanded. There is a problem in that, along with the increase in speed, self-excited oscillation, which is called "oil whirl", is liable to occur. Various measures for the self-excited oscillation have been considered, for example, as disclosed in Patent Literature 1. Further sufficient measures for the self-excited oscillation, which may tolerate the increase in speed of the rotary machine, have been strongly demanded.

An object of the present disclosure is to provide a bearing structure and a turbocharger, which are capable of improving an effect of suppressing self-excited oscillation.

Solution to Problem

In order to achieve the above-mentioned object, according to one embodiment of the present disclosure, there is provided a bearing structure, including: a housing having a bearing hole to which an opening portion of an oil supply passage is opened; and a semi-floating bearing including: an annular main body portion, which is received in the bearing hole, and has a bearing surface formed on an inner peripheral surface thereof; and one or a plurality of oil-introducing holes, which are formed in the main body portion to penetrate from an outer peripheral surface of the main body portion to the inner peripheral surface of the main body portion. At least one of the one or the plurality of oil-introducing holes is partially or entirely opposed to the opening portion of the oil supply passage, and is formed into a special hole in which a length in a rotation direction of a shaft is larger than a length in an axial direction of the shaft.

Further, the bearing surface may include two bearing surfaces which are separated apart from each other in the axial direction of the shaft, and the special hole may be opened to any one of the two bearing surfaces.

Further, the one or the plurality oil-introducing holes may include two oil-introducing holes formed in the two bearing surfaces, respectively, and one of the two oil-introducing holes may be the special hole.

In order to achieve the above-mentioned object, according to one embodiment of the present disclosure, there is provided a bearing structure, including: a housing having a bearing hole to which an opening portion of an oil supply passage is opened; and a semi-floating bearing including: an annular main body portion, which is received in the bearing hole, and has two bearing surfaces formed on an inner peripheral surface thereof to be separated apart from each other in an axial direction of a shaft; and an oil-introducing hole, which is formed in the main body portion, and has one end opened in any one of the two bearing surfaces and has another end partially or entirely opposed to the opening portion of the oil supply passage.

In order to achieve the above-mentioned object, according to one embodiment of the present disclosure, there is provided a bearing structure, including: a housing having a bearing hole to which an opening portion of an oil supply passage is opened; a semi-floating bearing including: an annular main body portion, which is received in the bearing hole, and has two bearing surfaces formed on an inner peripheral surface thereof to be separated apart from each other in an axial direction of a shaft; and two oil-introducing holes, which are formed in the main body portion of the semi-floating bearing and formed in the two bearing surfaces, respectively. Each of the two oil-introducing holes has one end opened in any one of the two bearing surfaces, and has another end partially or entirely opposed to the opening portion of the oil supply passage. The two oil-introducing holes are different from each other in at least one of area of being opposed to the opening portion in a radial direction of the shaft, opening area of the another end, and position in a rotation direction of the shaft.

In order to achieve the above-mentioned object, according to one embodiment of the present disclosure, there is provided a turbocharger, including any one of the above-mentioned bearing structures.

Effects of Disclosure

According to the present disclosure, the effect of suppressing the self-excited oscillation can be improved.

DESCRIPTION OF EMBODIMENT

Figure 1:
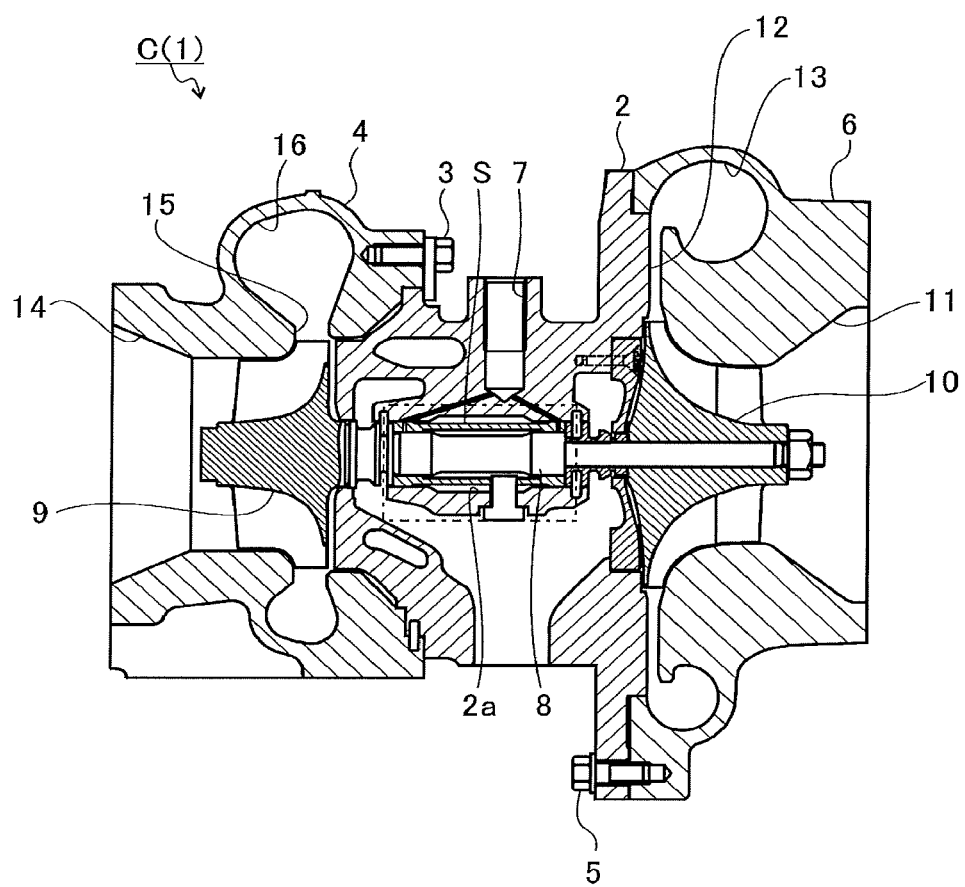
FIG. 1 is a schematic sectional view of a turbocharger.

Now, with reference to the attached drawings, a reasonable embodiment of the present disclosure is described in detail. The dimensions, materials, and other specific numerical values represented in the embodiment are merely examples used for facilitating the understanding of the present disclosure, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is a schematic sectional view of a turbocharger C. In the following description, the direction indicated by the arrow L illustrated in FIG. 1 corresponds to a left side of the turbocharger C, and the direction Indicated by the arrow R illustrated in FIG. 1 corresponds to a right side of the turbocharger C. As illustrated in FIG. 1, the turbocharger C includes a turbocharger main body 1. The turbocharger main body 1 includes a bearing housing 2 (housing). A turbine housing 4 is coupled to the left side of the bearing housing 2 by a fastening bolt 3. A compressor housing 6 is coupled to the right side of the bearing housing 2 by a fastening bolt 5. The turbocharger main body 1 is integrally formed of the bearing housing 2, the turbine housing 4, and the compressor housing 6.

The bearing housing 2 has a bearing hole 2a penetrating therethrough in a right-and-left direction of the turbocharger C. Further, the bearing housing 2 has an oil supply passage 7 for introducing lubricating oil to the bearing hole 2a from an outside. A semi-floating bearing S is received in the bearing hole 2a which is filled with the lubricating oil supplied through the oil supply passage 7. A shaft 8 is axially supported by the semi-floating bearing S so as to be rotatable. A turbine impeller 9 is integrally fixed to a left end portion of the shaft 8. The turbine impeller 9 is received in the turbine housing 4 so as to be rotatable. Further, a compressor impeller 10 is integrally fixed to a right end portion of the shaft 8. The compressor impeller 10 is received in the compressor housing 6 so as to be rotatable.

The compressor housing 6 has an intake port 11. The intake port 11 is opened on the right side of the turbocharger C. An air cleaner (not shown) is connected to the intake port 11. Further, under a state in which the bearing housing 2 and the compressor housing 6 are coupled to each other by the fastening bolt 5, a diffuser flow passage 12 for increasing the pressure of air is formed by opposed surfaces of the housings 2 and 6. The diffuser flow passage 12 is annularly formed so as to extend from a radially inner side to a radially outer side of the shaft 8. The diffuser flow passage 12 communicates with the intake port 11 on the above-mentioned radially inner side through intermediation of the compressor impeller 10.

Further, the compressor housing 6 has an annular compressor scroll flow passage 13. The compressor scroll flow passage 13 is positioned on the radially outer side of the shaft 8 with respect to the diffuser flow passage 12. The compressor scroll flow passage 13 communicates with an intake port of an engine (not shown). Further, the compressor scroll flow passage 13 communicates also with the diffuser flow passage 12. Thus, when the compressor impeller 10 is rotated, air is sucked into the compressor housing 6 through the intake port 11. The sucked air is increased in speed and pressure during a course of flowing through blades of the compressor impeller 10. This air is increased in pressure in the diffuser flow passage 12 and the compressor scroll flow passage 13, and is introduced to the intake port of the engine.

The turbine housing 4 has a discharge port 14. The discharge port 14 is opened on the left side of the turbocharger C. An exhaust gas purification device (not shown) is connected to the discharge port 14. Further, a flow passage 15 is formed in the turbine housing 4. Further, an annular turbine scroll flow passage 16 is formed in the turbine housing 4. The turbine scroll flow passage 16 is positioned on the radially outer side of the shaft 8 (turbine impeller 9) with respect to the flow passage 15. The turbine scroll flow passage 16 communicates with a gas inflow port (not shown) to which exhaust gas discharged from an exhaust gas manifold of the engine is introduced. Further, the turbine scroll flow passage 16 communicates also with the flow passage 15. Thus, the exhaust gas introduced through the gas inflow port to the turbine scroll flow passage 16 is introduced to the discharge port 14 through the flow passage 15 and the turbine impeller 9. The exhaust gas causes the turbine impeller 9 to rotate during a course of flowing. Then, a rotational force of the turbine impeller 9 is transmitted to the compressor impeller 10 through the shaft 8. The rotational force of the compressor impeller 10 causes the air to be increased in pressure and introduced to the intake port of the engine as described above.

Figure 2:
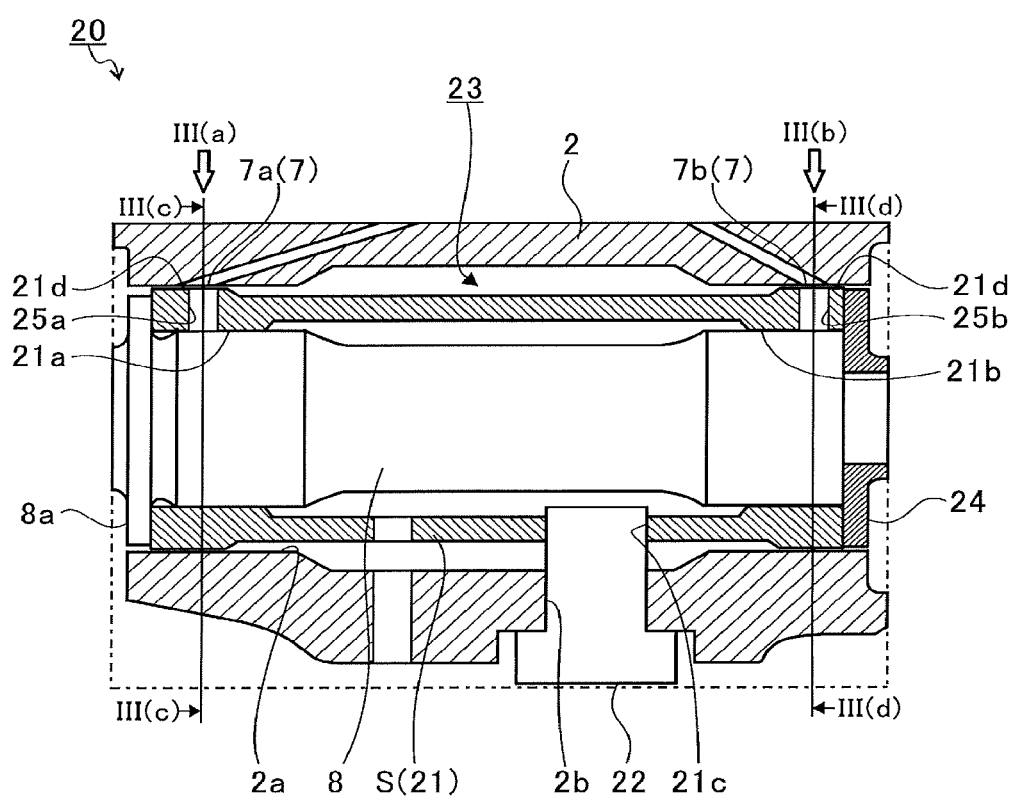
FIG. 2 is an extraction view of the one-dot chain line portion of FIG. 1.

FIG. 2 is an extraction view of the one-dot chain line portion of FIG. 1. As illustrated in FIG. 2, the turbocharger C includes a bearing structure 20. The bearing structure 20 includes the bearing hole 2a and the oil supply passage 7 formed in the bearing housing 2, and the semi-floating bearing S. In the following, detailed description is made of the bearing structure 20 of the turbocharger C for axially supporting the shaft 8.

The semi-floating bearing S includes an annular main body portion 21 received in the bearing hole 2a. On an inner periphery of the main body portion 21, there are formed a T-side (turbine housing 4 side) bearing surface 21a and a C-side (compressor housing 6 side) bearing surface 21b. The T-side bearing surface 21a is positioned on the turbine housing 4 side. The C-side bearing surface 21b is positioned on the compressor housing 6 side with respect to the T-side bearing surface 21a. The T-side bearing surface 21a and the C-side bearing surface 21b are separated apart in an axial direction of the shaft 8. The shaft 8 inserted into the main body portion 21 is axially supported by the T-side bearing surface 21a and the C-side bearing surface 21b so as to be rotatable.

Further, in the main body portion 21, a pin hole 21c is formed between the T-side bearing surface 21a and the C-side bearing surface 21b. The pin hole 21c penetrates in a direction intersecting the axial direction of the shaft 8, that is, in a radial direction of the shaft 8. Meanwhile, the bearing housing 2 has a through hole 2b. A regulation pin 22 is fixed to the through hole 2b by, for example, press-fitting. This through hole 2b is formed at a position opposed to the pin hole 21c. A distal end of the regulation pin 22 fixed to the through hole 2b enters the pin hole 21c. With this configuration, movement of the semi-floating bearing S in a rotation direction of the shaft 8 is regulated.

A gap 23 is formed between an outer peripheral surface of the main body portion 21 and an inner peripheral surface of the bearing hole 2a. On the outer peripheral surface of the main body portion 21, damper surfaces 21d are formed at both ends in the axial direction of the shaft 8. The damper surfaces 21d are portions at which the gap 23 formed between the main body portion 21 and the bearing hole 2a is smallest. The lubricating oil supplied between the damper surfaces 21d and the inner peripheral surface of the bearing hole 2a is caused to function as a damper, thereby suppressing oscillation of the shaft 8.

Further, a flange portion 8a is formed on the shaft 8. The flange portion 8a is positioned in the bearing hole 2a. The flange portion 8a has an outer diameter larger than that of a portion of the semi-floating bearing S, which is inserted into the main body portion 21. The flange portion 8a is opposed to an end surface of the main body portion 21 on one side in the axial direction of the shaft 8, which is herein the left side in FIG. 2. Meanwhile, an oil thrower member 24 is arranged opposed to an end surface of the main body portion 21 on another side in the axial direction of the shaft 8, which is herein the right side in FIG. 2. The oil thrower member 24 is rotated integrally with the shaft 8. The oil thrower member 24 is fixed to the shaft 8 by, for example, fastening with a bolt. The oil thrower member 24 is configured to diffuse the lubricating oil, which moves from the semi-floating bearing S to the compressor impeller 10 side, toward the radially outer side of the shaft 8. In this manner, leakage of the lubricating oil to the compressor impeller 10 side can be suppressed.

As described above, the semi-floating bearing S is positioned between the flange portion 8a of the shaft 8 and the oil thrower member 24. Both end surfaces of the main body portion 21 in the axial direction are opposed to the flange portion 8a and the oil thrower member 24, respectively. Thus, the semi-floating bearing S receives a thrust load from the flange portion 8a and the oil thrower member 24. Further, the semi-floating bearing S receives a radial load of the shaft 8 on the T-side bearing surface 21a and the C-side bearing surface 21b.

The bearing housing 2 has the oil supply passage 7 for introducing the lubricating oil from the outside to the bearing hole 2a. The oil supply passage 7 is branched into two passages in the bearing housing 2. The branched passages are opened at two different positions in the bearing hole 2a. Herein, with regard to the opening portions of the oil supply passage 7 in the bearing hole 2a, the opening portion which is positioned relatively closer to the turbine housing 4 side is referred to as a T-side opening portion 7a. Further, with regard to the opening portions of the oil supply passage 7 in the bearing hole 2a, the opening portion which is positioned relatively closer to the compressor housing 6 side is referred to as a C-side opening portion 7b. The T-side opening portion 7a is positioned on a radially outer side of the T-side bearing surface 21a of the main body portion 21. The C-side opening portion 7b is positioned on a radially outer side of the C-side bearing surface 21b of the main body portion 21.

Further, the main body portion 21 has a T-side oil-introducing hole 25a and a C-side oil-introducing hole 25b. The T-side oil-introducing hole 25a penetrates in the radial direction of the shaft 8 from the T-side bearing surface 21a to the damper surface 21d. The C-side oil-introducing hole 25b penetrates in the radial direction of the shaft 8 from the C-side bearing surface 21b to the damper surface 21d. As described above, the T-side opening portion 7a is positioned on the radially outer side of the T-side bearing surface 21a. Further, the T-side oil-introducing hole 25a is opened, on the side of the inner peripheral surface of the main body portion 21, in the T-side bearing surface 21a, and an opening of the T-side oil-introducing hole 25a on the side of the outer peripheral surface of the main body portion 21 is opposed to the T-side opening portion 7a. Similarly, the C-side opening portion 7b is positioned on the radially outer side of the C-side bearing surface 21b. Further, the C-side oil-introducing hole 25b is opened, on the side of the inner peripheral surface of the main body portion 21, in the C-side bearing surface 21b, and an opening of the C-side oil-introducing hole 25b on the side of the outer peripheral surface of the main body portion 21 is opposed to the C-side opening portion 7b.

Thus, part of the lubricating oil introduced through the T-side opening portion 7a to the bearing hole 2a by driving of a pump is directly introduced to the T-side bearing surface 21a through the T-side oil-introducing hole 25a. Further, part of the lubricating oil introduced through the C-side opening portion 7b to the bearing hole 2a is directly introduced to the C-side bearing surface 21b through the C-side oil-introducing hole 25b. With this configuration, the lubricating oil can be sufficiently ensured on the T-side bearing surface 21a and the C-side bearing surface 21b.

Further, both of the T-side opening portion 7a and the C-side opening portion 7b maintain a dimensional relationship in which at least part thereof is prevented from being opposed to the T-side oil-introducing hole 25a and the C-side oil-introducing hole 25b. Therefore, part of the lubricating oil introduced to the bearing hole 2a through the T-side opening portion 7a and the C-side opening portion 7b is introduced to the side of the outer peripheral surface of the main body portion 21. The part of the lubricating oil introduced to the side of the outer peripheral surface of the main body portion 21 offers the damper function on the damper surfaces 21d. In the following, detailed description is made of shapes of the T-side oil-introducing hole 25a and the C-side oil-introducing hole 25b.

Figure 3A:
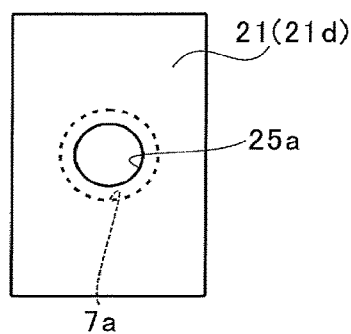
FIG. 3A is a view as seen from a direction indicated by the arrow III(a) of FIG. 2.
Figure 3B:
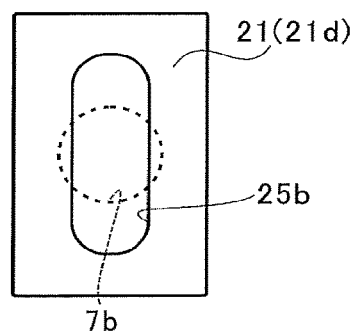
FIG. 3B is a view as seen from a direction indicated by the arrow III(b) of FIG. 2.
Figure 3C:
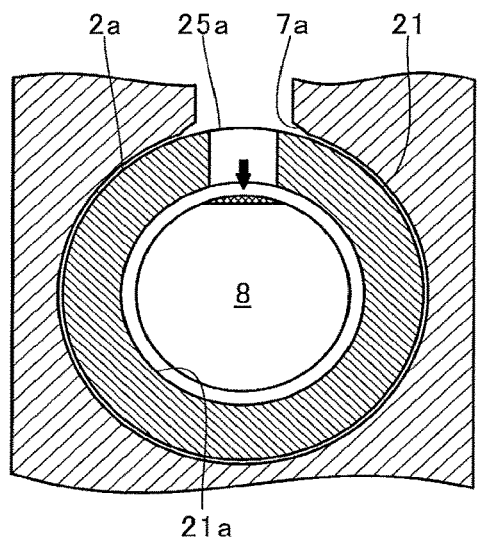
FIG. 3C is a sectional view taken along the line III(c)-III(c) of FIG. 2.
Figure 3D:
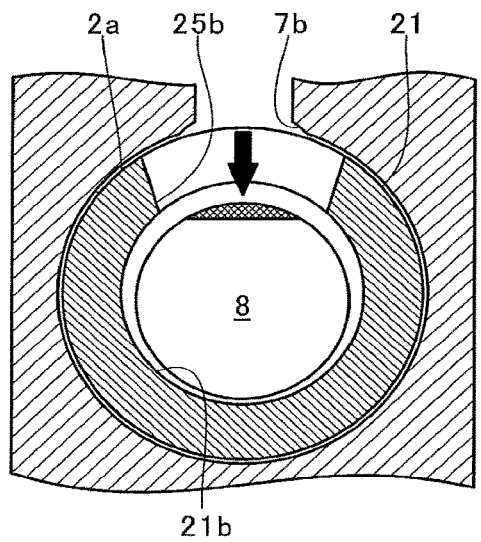
FIG. 3D is a sectional view taken along the line III(d)-III(d) of FIG. 2.

FIG. 3A is a view as seen from a direction indicated by the arrow III(a) of FIG. 2. FIG. 3B is a view as seen from a direction indicated by the arrow III(b) of FIG. 2. In FIG. 3A and FIG. 3B, the bearing housing 2 is omitted. Further, in FIG. 3A and FIG. 3B, only the T-side opening portion 7a or the C-side opening portion 7b is illustrated with the dashed circle. FIG. 3C is a sectional view taken along the line III(c)-III(c) of FIG. 2. FIG. 3D is a sectional view taken along the line III(d)-III(d) of FIG. 2.

As illustrated in FIG. 3A, both the T-side opening portion 7a and the T-side oil-introducing hole 25a have a shape of a substantially perfect circle. Further, the T-side opening portion 7a and the T-side oil-introducing hole 25a are formed at positions at which centers thereof substantially match with each other. However, an opening area of the T-side oil-introducing hole 25a is smaller than an opening area of the T-side opening portion 7a. Therefore, a center side of the T-side opening portion 7a is opposed to the T-side oil-introducing hole 25a, but an outer peripheral edge side of the T-side opening portion 7a is not opposed to the T-side oil-introducing hole 25a. That is, the outer peripheral edge side of the T-side opening portion 7a is opposed to the outer peripheral surface of the main body portion 21. As described above, opening areas of the T-side oil-introducing hole 25a and the T-side opening portion 7a are set different from each other. The lubricating oil introduced through the T-side oil-introducing hole 25a to the bearing hole 2a is suitably distributed to the T-side bearing surface 21a and the damper surface 21d.

Meanwhile, as illustrated in FIG. 3B, the C-side opening portion 7b has substantially the same shape as that of the T-side opening portion 7a. In contrast, the C-side oil-introducing hole 25b has a shape of an elongated hole extending in the rotation direction of the shaft 8, that is, in an up-and-down direction of FIG. 3B. More specifically, the C-side oil-introducing hole 25b is partially opposed to the C-side opening portion 7b of the oil supply passage 7. Further, the C-side oil-introducing hole 25b is formed of a special hole in which a length in the rotation direction of the shaft 8 is larger than a length in the axial direction of the shaft 8. In the following, the hole in which a length in the rotation direction of the shaft 8 is larger than a length in the axial direction of the shaft 8 is simply referred to as "special hole".

The lubricating oil is pumped with a discharge pressure of, for example, an engine pump to the oil supply passage 7. Therefore, the lubricating oil entering the C-side oil-introducing hole 25b through the C-side opening portion 7b causes a load to act on the shaft 8 vertically downward as indicated by the solid arrow in FIG. 3D. The C-side oil-introducing hole 25b has a shape of an elongated hole extending in the rotation direction of the shaft 8. Therefore, an area of a portion of the outer peripheral surface of the shaft 8, which faces the C-side opening portion 7b through the C-side oil-introducing hole 25b (range indicated by cross-hatching in FIG. 3D), is increased.

As described above, the portion of the outer peripheral surface of the shaft 8, which faces the C-side opening portion 7b through the C-side oil-introducing hole 25b, serves as a pressure-receiving surface for receiving a pressure of the lubricating oil. The C-side oil-introducing hole 25b is formed into the special hole having a shape of an elongated hole, thereby increasing a pressure-receiving area. As a result, a load of pressing the shaft 8 vertically downward is increased. When the load acting on the shaft 8 is increased, deviation which occurs between a center of the C-side bearing surface 21b and an axial center of the shaft 8, that is, an eccentricity amount of the shaft 8 with respect to the C-side bearing surface 21b is increased. With this configuration, the effect of suppressing self-excited oscillation is improved.

As described above, the bearing structure 20 according to this embodiment employs the semi-floating bearing S. The semi-floating bearing S is originally less liable to cause self-excited oscillation as compared to, for example, a full-floating bearing. The bearing structure 20 further applies the above-mentioned configuration to such semi-floating bearing S. Thus, even when increase in speed is further pursued, the bearing structure 20 is capable of reliably suppressing the self-excited oscillation.

The reasonable embodiment of the present disclosure has been described above with reference to the attached drawings, but, needless to say, the present disclosure is not limited to the embodiment. It is apparent that those skilled in the art may arrive at various alternations and modifications within the scope of claims, and those examples are construed as naturally falling within the technical scope of the present disclosure.

For example, in the above-mentioned embodiment, in the main body portion 21 of the semi-floating bearing S, the two bearing surfaces (T-side bearing surface 21a and C-side bearing surface 21b) are formed to be separated apart from each other in the axial direction of the shaft 8. The oil-introducing holes (T-side oil-introducing hole 25a and C-side oil-introducing hole 25b) are opened in the bearing surfaces, respectively. However, the number of bearing surfaces formed on the inner peripheral surface of the main body portion 21 is not particularly limited.

Further, in the above-mentioned embodiment, the oil-introducing holes (T-side oil-introducing hole 25a and C-side oil-introducing hole 25b) are opened in the two bearing surfaces (T-side bearing surface 21a and C-side bearing surface 21b), respectively. Only the C-side oil-introducing hole 25b of the two oil-introducing holes is formed into the special hole. However, both of the T-side oil-introducing hole 25a and the C-side oil-introducing hole 25b may be formed into the special holes. Further, only the T-side oil-introducing hole 25a may be formed into the special hole. However, in general, in the turbocharger, the turbine impeller 9 made of heat-resistant alloy and the compressor impeller 10 made of an aluminum-based material are used in many cases. The heat-resistant alloy is metal having a specific gravity larger than that of the aluminum-based material. Therefore, a gravity center position in the axial direction of the shaft 8 falls within a region of the T-side bearing surface 21a or is closer to the T-side bearing surface 21a side between the T-side bearing surface 21a and the C-side bearing surface 21b. Therefore, a bearing load acting on the C-side bearing surface 21b by own weight is smaller than that on the T-side bearing surface 21a. When the C-side oil-introducing hole 25b is formed into the special hole so as to increase the eccentricity amount of the shaft 8 with respect to the C-side bearing surface 21b, effective suppression of the self-excited oscillation can be expected. Further, in the above-mentioned embodiment, the main body portion 21 has two oil-introducing holes (T-side oil-introducing hole 25a and C-side oil-introducing hole 25b). Further, the T-side opening portion 7a and the C-side opening portion 7b of the oil supply passage 7 are opposed to both of the oil-introducing holes. However, the number and arrangement of the oil-introducing holes are not limited thereto.

Figure 4:
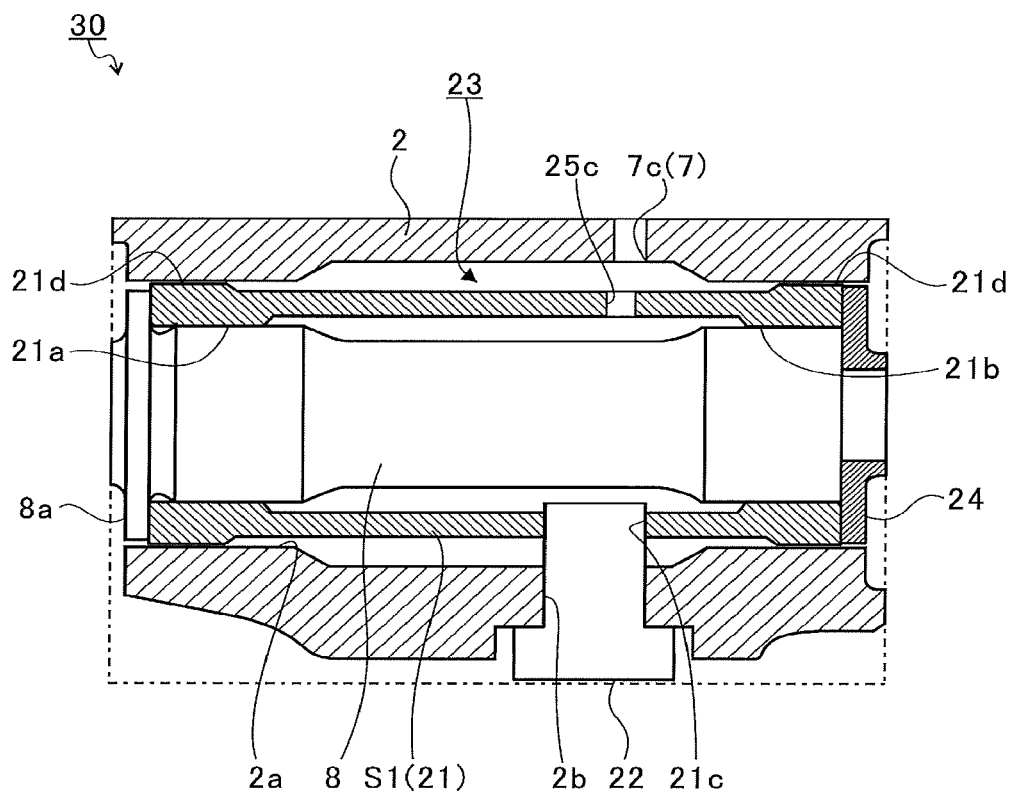
FIG. 4 is an explanatory view for illustrating a first modification example.

FIG. 4 is an explanatory view for illustrating a first modification example. In a bearing structure 30 illustrated in FIG. 4, an opening portion 7c is formed in place of the T-side opening portion 7a and the C-side opening portion 7b of the above-mentioned embodiment. Further, in the bearing structure 30, an oil-introducing hole 25c is formed in place of the T-side oil-introducing hole 25a and the C-side oil-introducing hole 25b. Other configurations of the bearing structure 30 are the same as those of the above-mentioned embodiment. Thus, the same configurations as those of the above-mentioned embodiment are denoted by the same reference symbols, and description thereof is omitted. In the bearing structure 30 of the first modification example, the main body portion 21 of a semi-floating bearing S1 has the oil-introducing hole 25c. As illustrated in FIG. 4, the oil-introducing hole 25c is formed between the T-side bearing surface 21a and the C-side bearing surface 21b.

The oil-introducing hole 25c is formed into the special hole similarly to the C-side oil-introducing hole 25b of the above-mentioned embodiment. Further, the oil supply passage 7 formed the bearing housing 2 is opened at the opening portion 7c to the bearing hole 2a. The opening portion 7c is partially opposed to the oil-introducing hole 25c. As described above, when the oil-introducing hole for introducing the lubricating oil from the outer peripheral surface side of the main body portion 21 to the inner peripheral surface side thereof is the special hole, the oil-introducing hole does not always need to be formed in the bearing surface. Similarly to the oil-introducing hole 25c, the special hole may be formed at a position different from the bearing surface. That is, the number and arrangement of the oil-introducing hole formed into the special hole may suitably be designed. Also with the bearing structure 30 of the first modification example, similarly to the above-mentioned embodiment, the load acting on the shaft 8 is increased, thereby suppressing the self-excited oscillation. In the case where the oil-introducing hole 25c is to be formed at a position different from the bearing surface as described above, when a separation distance between the opening portion 7c and the oil-introducing hole 25c in the radial direction is increased, the load becomes less likely to act on the shaft 8. Therefore, it is better that the separation distance between the opening portion 7c and the oil-introducing hole 25c in the radial direction be reduced.

Figure 5A:
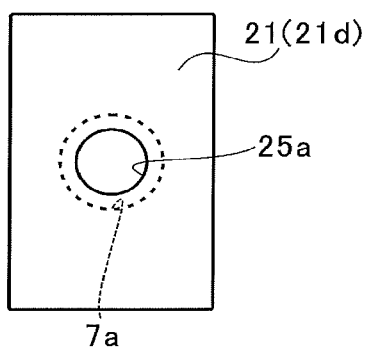
FIG. 5A and FIG. 5B are explanatory views for illustrating a second modification example.
Figure 5B:
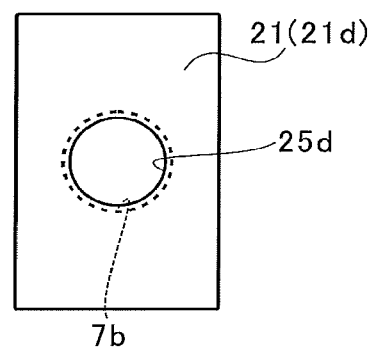
Figure 5C:
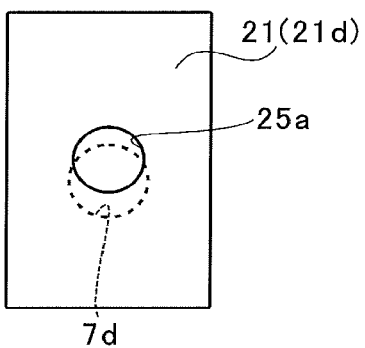
FIG. 5C and FIG. 5D are explanatory views for illustrating a third modification example.
Figure 5D:
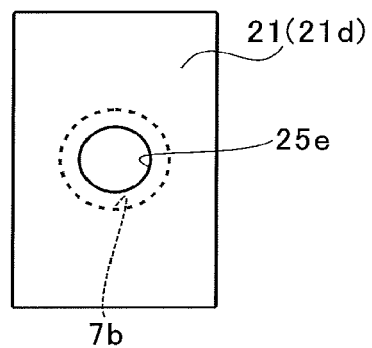

FIG. 5A and FIG. 5B are views for illustrating the second modification example, and FIG. 5C and FIG. 5D are views for illustrating the third modification example. In the second modification example described below, the C-side oil-introducing hole 25b of the above-mentioned embodiment is changed to a C-side oil-introducing hole 25d. Further, in the third modification example, the T-side opening portion 7a of the above-mentioned embodiment is changed to a T-side opening portion 7d, and the C-side oil-introducing hole 25b is changed to a C-side oil-introducing hole 25e. Other configurations of the second modification example and the third modification example are all the same as those of the above-mentioned embodiment.

The C-side oil-introducing hole 25d of the second modification example illustrated in FIG. 5B has a shape of a perfect circle similarly to the T-side oil-introducing hole 25a. However, the C-side oil-introducing hole 25d has an area larger than that of the T-side oil-introducing hole 25a. Further, an area of the C-side opening portion 7b and the C-side oil-introducing hole 25d opposed to each other in the radial direction of the shaft 8 is larger than an area of the T-side opening portion 7a and the T-side oil-introducing hole 25a opposed to each other in the radial direction of the shaft 8. With this configuration, the load acting on the shaft 8 by the pressure of the lubricating oil becomes larger on the compressor housing 6 side than the turbine housing 4 side. According to the second modification example, the eccentricity amount of the shaft 8 with respect to the C-side bearing surface 21b, which receives a small bearing load in many cases, is increased positively. In such a manner, the self-excited oscillation is suppressed.

The C-side oil-introducing hole 25e of the third modification example illustrated in FIG. 5D has a shape of a perfect circle similarly to the T-side oil-introducing hole 25a. Further, the T-side oil-introducing hole 25a and the C-side oil-introducing hole 25e have the same shape. Further, the T-side opening portion 7d has an opening area smaller than that of the C-side opening portion 7b. Moreover, the T-side opening portion 7d is formed at a position slightly shifted with respect to the C-side opening portion 7b in a circumferential direction of the bearing hole 2a. As a result, an area of the C-side oil-introducing hole 25e and the C-side opening portion 7b opposed to each other in the radial direction of the shaft 8 is larger than an area of the T-side oil-introducing hole 25a and the T-side opening portion 7d opposed to each other in the radial direction of the shaft 8. With this configuration, the load acting on the shaft 8 by the pressure of the lubricating oil becomes larger on the compressor housing 6 side than the turbine housing 4 side. According to the third modification example, similarly to the second modification example described above, the eccentricity amount of the shaft 8 with respect to the C-side bearing surface 21b is increased, thereby suppressing the self-excited oscillation.

Figure 6:
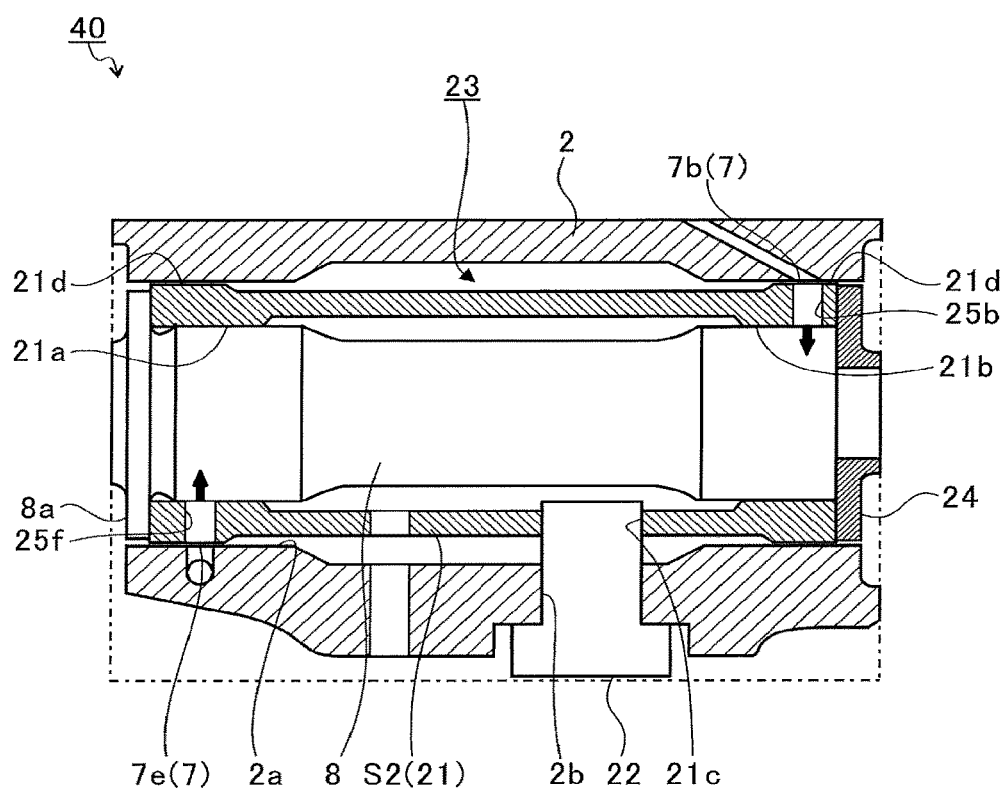
FIG. 6 is an explanatory view for illustrating a fourth modification example.

FIG. 6 is an explanatory view for illustrating a fourth modification example. In the fourth modification example described below, the T-side oil-introducing hole 25a of the above-mentioned embodiment is changed to a T-side oil-introducing hole 25f, and the T-side opening portion 7a is changed to a T-side opening portion 7e. The fourth modification example has the same configurations as those of the above-mentioned embodiment except for the gravity center position in the axial direction of the shaft 8. The fourth modification example is particularly effective in a case where the gravity center position in the axial direction of the shaft 8 is positioned on the turbine impeller 9 side which is an outer side of the region of the T-side bearing surface 21a (side of separating from the C-side bearing surface 21b). For example, a volume of the turbine impeller 9 is sometimes larger than that of the compressor impeller 10 in accordance with an engine specification. As the volume of the turbine impeller 9 becomes larger than that of the compressor impeller 10, the gravity center position in the axial direction of the shaft 8 becomes closer to the turbine impeller 9 side. In a bearing structure 40 of the fourth modification example, the T-side oil-introducing hole 25f is formed in the main body portion 21 of a semi-floating bearing S2. As illustrated in FIG. 6, in the T-side oil-introducing hole 25f, one end on the inner peripheral surface side is opened to the T-side bearing surface 21a. The T-side oil-introducing hole 25f is different from the C-side oil introducing hole 25b by approximately 180° in position in the rotation direction of the shaft 8, that is, in position in the circumferential direction of the main body portion 21.

When the gravity center position in the axial direction of the shaft 8 is on the turbine impeller 9 side which is the outer side of the region of the T-side bearing surface 21a, the bearing load by own weight acts vertically downward on the T-side bearing surface 21a. Meanwhile, the bearing load by own weight acts vertically upward on the C-side bearing surface 21b. In contrast, in the bearing structure 40, as indicated by the solid arrow of FIG. 6, the load acts on the shaft 8 vertically upward by the pressure of the lubricating oil on the T-side bearing surface 21a side. Thus, the eccentricity amount of the shaft 8 with respect to the T-side bearing surface 21a can be prevented from being excessive. Meanwhile, on the C-side bearing surface 21b side, the load acts on the shaft 8 vertically downward. Therefore, the eccentricity amount of the shaft 8 with respect to the C-side bearing surface 21b may be increased, thereby suppressing the self-excited oscillation. In other words, the self-excited oscillation is suppressed, and excessive inclination of the shaft 8 can be secondarily suppressed. With this configuration, for example, contact between the compressor impeller 10 and the compressor housing 6 can be prevented.

As described above, in the second to fourth modification examples, without forming the oil-introducing hole into the special hole as in the above-mentioned embodiment and the first modification example, the effect of suppressing the self-excited oscillation can be achieved.

The above-mentioned second to fourth modification examples can be combined with each other. That is, the two oil-introducing holes only need to be different from each other in at least one of area of being opposed to the opening portion in the radial direction of the shaft 8, area of the opening of each oil-introducing hole opposed to the opening portion of the oil supply passage, and position in the rotation direction of the shaft 8. Each of the two oil-introducing holes is partially or entirely opposed to the opening portion of the oil supply passage. Further, in addition, the above-mentioned embodiment and the first modification example may be combined to form the oil-introducing hole into the special hole.

Further, for example, in the above-mentioned embodiment, the T-side opening portion 7a and the T-side oil-introducing hole 25a may be omitted. Then, only the C-side opening portion 7b and the C-side oil-introducing hole 25b may be formed. Alternatively, the oil may be directly supplied from the oil supply passage 7 to only one of the two bearing surfaces. Also in this case, the eccentricity amount of the shaft 8 with respect to the C-side bearing surface 21b is increased, thereby being capable of suppressing the self-excited oscillation. Further, in this case, the opening portion 7c and the oil-introducing hole 25c of the above-mentioned first modification example may be additionally formed.

In the above-mentioned embodiment and the modification examples, the oil-introducing holes formed in the main body portion 21 are only partially opposed to the opening portions of the oil supply passage 7 opened to the bearing hole 2a. However, the oil-introducing holes may be entirely opposed to the opening portions.

Further, the bearing structures of the above-mentioned embodiment and the modification examples are applicable not only to the turbocharger, and may also be applicable to various types of rotary machines.

INDUSTRIAL APPLICABILITY

The present disclosure is usable for a bearing structure including a semi-floating bearing and for a turbocharger including the bearing structure.

What is claimed is:

1. A turbocharger, comprising:
a shaft including a turbine impeller and a compressor impeller, the turbine impeller being positioned at a first end of the shaft and the compressor impeller being positioned at a second end of the shaft;
a housing having a bearing hole to which a turbine-side opening portion and a compressor-side opening portion of an oil supply passage are opened, the turbine-side opening portion being positioned relatively closer to the turbine impeller than the compressor-side opening portion; and
a semi-floating bearing comprising:
an annular main body portion, which is received in the bearing hole, and has a turbine-side bearing surface and a compressor-side bearing surface formed on an inner peripheral surface thereof; and
a turbine-side oil-introducing hole and a compressor-side oil-introducing hole, which are formed in the main body portion, the turbine-side oil-introducing hole penetrating from an outer peripheral surface of the main body portion to the turbine-side bearing surface, the compressor-side oil-introducing hole penetrating from the outer peripheral surface of the main body portion to the compressor-side bearing surface,
wherein an opening of the turbine-side oil-introducing hole on a side of the outer peripheral surface of the main body portion is opposed to the turbine-side opening portion,
wherein an opening of the compressor-side oil-introducing hole on the side of the outer peripheral surface of the main body portion is opposed to the compressor-side opening portion, and
wherein only the compressor-side oil-introducing hole is a special hole in which a length in a rotation direction of the shaft is larger than a length in an axial direction of the shaft.

2. The turbocharger according to claim 1, wherein opening areas of the turbine-side oil-introducing hole and the compressor-side oil-introducing hole are different than opening areas of the turbine-side opening portion and the compressor-side opening portion of the oil supply passage.

3. The turbocharger according to claim 1, wherein the turbine-side oil-introducing hole is the only hole formed on the turbine-side bearing surface, and the compressor-side oil-introducing hole is the only hole formed on the compressor-side bearing surface.

4. The turbocharger according to claim 1, wherein a gravity center position in the axial position is closer to the turbine-side bearing surface than the compressor-side bearing surface.

5. A turbocharger, comprising:
a shaft including a turbine impeller and a compressor impeller, the turbine impeller being positioned at a first end of the shaft and the compressor impeller being positioned at a second end of the shaft;
a housing having a bearing hole to which a turbine-side opening portion and a compressor-side opening portion of an oil supply passage are opened, the turbine-side opening portion being positioned relatively closer to the turbine impeller than the compressor-side opening portion; and
a semi-floating bearing comprising:
an annular main body portion, which is received in the bearing hole, and has a turbine-side bearing surface and a compressor-side bearing surface formed on an inner peripheral surface thereof to be separated apart from each other in an axial direction of a shaft; and
a turbine-side oil-introducing hole and a compressor-side oil-introducing hole, which are formed in the main body portion of the semi-floating bearing, the turbine-side oil-introducing hole penetrating from an outer peripheral surface of the main body portion to the turbine-side bearing surface, the compressor-side oil-introducing hole penetrating from the outer peripheral surface of the main body portion to the compressor-side bearing surface,
wherein an opening of the turbine-side oil-introducing hole on a side of the outer peripheral surface of the main body portion is opposed to the turbine-side opening portion,
wherein an opening of the compressor-side oil-introducing hole on the side of the outer peripheral surface of the main body portion is opposed to the compressor-side opening portion, and
wherein the compressor-side oil-introducing hole has an area larger than that of the turbine-side oil-introducing hole, or an area of the compressor-side opening portion that overlaps the compressor-side oil-introducing hole in a radial direction of the shaft is larger than an area of the turbine-side opening portion that overlaps the turbine-side oil-introducing hole in the radial direction of the shaft.

6. The turbocharger according to claim 5, wherein opening areas of the turbine-side oil-introducing hole and the compressor-side oil-introducing hole are different than opening areas of the turbine-side opening portion and the compressor-side opening portion of the oil supply passage.

7. The turbocharger according to claim 5, wherein the turbine-side oil-introducing hole is the only hole formed on the turbine-side bearing surface, and the compressor-side oil-introducing hole is the only hole formed on the compressor-side bearing surface.

8. The turbocharger according to claim 5, wherein a gravity center position in the axial position is closer to the turbine-side bearing surface than the compressor-side bearing surface.

* * * * *